United States Patent
Deng et al.

(10) Patent No.: US 8,364,158 B2
(45) Date of Patent: Jan. 29, 2013

(54) METHOD AND SYSTEM FOR CELL UPDATE (75) Inventors: Yun Deng, Shenzhen (CN); Jin Xi, Shenzhen (CN)

(73) Assignee: ZTE Corporation, Hi-Tech Industrial Park, Nanshan District, Shenzhen, Guangdong Province (CN)

( * ) Notice: Subject to any disclaimer, the term of this patent is extended or adjusted under 35 U.S.C. 154(b) by 0 days.

(21) Appl. No.: 13/386,414

(22) PCT Filed: Aug. 12, 2010

(86) PCT No.: PCT/CN2010/075927
§ 371 (c)(1),
(2), (4) Date: Jan. 21, 2012

(87) PCT Pub. No.: WO2011/018040
PCT Pub. Date: Feb. 17, 2011

(65) Prior Publication Data
US 2012/0129529 A1 May 24, 2012

(30) Foreign Application Priority Data
Aug. 13, 2009 (CN) .......................... 2009 1 0162771

(51) Int. Cl.
*H04W 72/00* (2009.01)
(52) U.S. Cl. ...................... 455/450; 455/509; 455/452.1; 455/452.2; 455/435.2; 455/437; 455/456.1
(58) Field of Classification Search .................. 455/509, 455/450, 452.1, 452.2, 435.2, 437, 456.1
See application file for complete search history.

(56) References Cited

U.S. PATENT DOCUMENTS
2007/0116011 A1 * 5/2007 Lim et al. ................. 370/395.52
2007/0270152 A1 11/2007 Nylander et al.

FOREIGN PATENT DOCUMENTS
CN 101466128 A 6/2009
WO 2008157841 A1 12/2008

OTHER PUBLICATIONS
International Search Report for PCT/CN2010/075927 dated Nov. 11, 2010.

* cited by examiner

*Primary Examiner* — Kwasi Karikari
(74) *Attorney, Agent, or Firm* — Ling Wu; Stephen Yang; Ling and Yang Intellectual Property LLC (57) ABSTRACT

The present invention discloses a method and system for cell update. The method comprises: a target home NodeB receiving cell update signaling sent by a User Equipment (UE); the target home NodeB sending signaling carrying cell update information to a Source Radio Network Controller (SRNC) through a home NodeB gateway and a core network, or sending the signaling carrying the cell update information to a source home NodeB through the home NodeB gateway; the target home NodeB receiving signaling carrying UE Context and returned by the SRNC or the source home NodeB; and the target home NodeB allocating corresponding radio resources to the UE and sending a cell update confirmation message to the UE. The system is used to implement the method for cell update. The method and system enables the UE to perform cell update without restriction.

11 Claims, 5 Drawing Sheets

METHOD AND SYSTEM FOR CELL UPDATE

TECHNICAL FIELD

The present invention relates to cell update technologies in the field of mobile communications, and in particular, to a method and system for cell update.

BACKGROUND OF THE RELATED ART

In order to provide wideband mobile communication services which cannot be provided by the second generation mobile communication systems due to technical limitations, the International Telecommunication Union Telecommunication Standardization Bureau (ITU-T) provides the third generation mobile communication systems. The Wideband Code Division Multiple Access (WCDMA), which is one of the main candidate schemes of the third generation mobile communication, gets extensive application due to its good compatibility with the GSM system based on the Global System for Mobile Communications Mobile Network Application Part (GSM MAP) core network by using Universal Mobile Telecommunication System (UMTS) Terrestrial Radio Access Network (UTRAN) as a wireless interface.

In the WCDMA, the cell update technology is an important process in WCDMA access technologies. When change of a location, a wireless link failure, etc., occur in a User Equipment (UE) in a connected state, this process is required to be used to inform the network to achieve UTRAN registration area update, or obtain new radio resources. Several main reasons why the UE initiates cell update will be described below.)

1) When a UE in a UTRAN Registration Area_paging Channel (URA_PCH or Cell_Paging Channel (Cell_PCH) state reenters a service area, the network needs to be informed to initiate a URA update or a cell update process.

2) When there is an unrepairable RLC error on an Acknowledge Mode-Radio Link Control (AM RLC) entity, the network needs to be informed to initiate cell update.

3) A UE in a Cell_forward Access Channel (Cell_FACH), Cell_PCH, URA_PCH state periodically initiates a cell update or URA update process.

4) When cell update is required to be implemented after cell reselection, the UE is in other connected states other than a Cell_Dedicated transmission channel (Cell_DCH) state.

5) When a wireless link failure or transmission UE capability information failure occurs in the UE in the Cell_DCH, cell update is initiated.

6) Since a paging of the network or uplink transmission data that requests transfer from the Cell_PCH state, the URA_PCH state to the Cell_FACH state is received, cell update is required to be initiated.

7) When the UE in a connected state other than the Cell_DCH state receives Multimedia Broadcast Multicast Services (MBMS), cell update is required to be initiated.

It can be seen from the above description that the cell update procedure is widely used in a Radio Network Controller (RNC) and NodeBs which is under the jurisdiction of the RNC, and is also used between RNCs with an Iur interface. The cell update procedure is mainly implemented based on a signaling process in the Iur interface Radio Network Subsystem Application Part (RNSAP) protocol, and specifically, based on an uplink signaling transfer indication. In the implementation process, a wireless link establishing process or a public transmission channel resource initialization process in the RNSAP protocol may also be initiated for a target RNC according to actual conditions, and a wireless link deletion process or a public transport signal resource release process in the RNSAP protocol is initiated for a source RNC.

The process of cell update between he RNCs is that: after a UE in a connected state, such as Cell_DCH state, or Cell_FACH state, or Cell_PCH state, or URA_PCH state, is resided in a cell which is under the jurisdiction of another RNC (which is referred to as a Drift RNC (DRNC), or a Target RNC (TRNC)) for the above reasons, the UE sends a cell update message to the DRNC; after receiving the message, the DRNC sends an uplink signaling transfer indication to a Source RNC (SRNC) through the :fur interface between the RNCs; the SRNC initiates a Service Radio Network Subsystem Relocation (SRNS Relocation) process; the DRNC sends a cell update confirmation message to the UE after the relocation process ends; and a subsequent signaling process proceeds as needed after the cell update process ends.

In the modern wireless network system construct on, indoor coverage has become the most important part of the network construction, On one hand, a suitable indoor coverage scheme can allow the network to play its role furthest, and create greater value for operators; on the other hand, the suitable indoor coverage scheme can also greatly save the cost of network construction for the operators, and authentically achieve low-input high return. As a result, a radio access device called home NodeB emerges as the times require. Home NodeBs as exclusive resources of private users are deployed in private places such as homes, groups, companies or schools, so as to provide various high-speed radio access services and tariff concessions to the users, while makes up for a contradiction of insufficient coverage of existing distributed cellular wireless communication systems.

Figure 1:
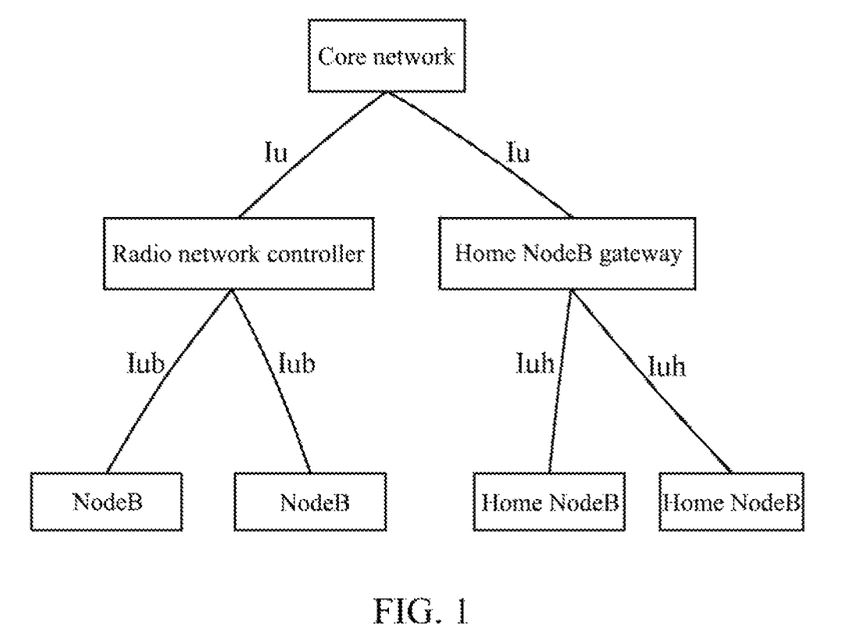
FIG. 1 is a schematic diagram of a network layout of a WCDMA system.

FIG. 1 is a schematic diagram of a network layout of a WCDMA system. As shown in FIG. 1, Home NodeBs are introduced in the WCDMA system. The home NodeBs are connected to a core network through a home NodeB gateway, and interfaces between the home NodeBs and the home NodeB gateway are hills. The home NodeB gateway provides services, such as registration, for the home NodeBs, and is similar to a RNC such that the existing core network can communicate with the home NodeB gateway using the existing Iu interface. However, there is no interface between the home NodeB gateways, so they cannot communicate directly.

With widespread deployment of the home NodeBs and great increase of users, after a UE originally located in a home NodeB and being in a connected state initiates cell update for some reason, if a target cell is not a source home NodeB cell, the cell update can not be implemented, the network will actively release the UE, and the UE will return to an idle state, which will seriously affect user experiences. Likewise, after the UE originally located in a macro cell and being in a connected state initiates cell update, if the target cell is a home NodeB cell, the problem of releasing will also occur.

Therefore, how to deal with the cell update procedure between the home NodeB gateways or between the home NodeB gateway and the RNC becomes a problem required to be solved.

CONTENT OF THE INVENTION

In view of this, a main object of the present invention is to provide a method and system for cell update so as to implement cell update for the UE between home NodeB gateways or between a home NodeB gateway and a RNC.

In order to achieve the above object, the technical scheme of the present invention is implemented as follows.

The present invention provides a method for cell update comprising:

a target home NodeB receiving cell update signaling sent by a User Equipment (UE);

the target home NodeB sending signaling carrying cell update information to a Source Radio Network Controller (SRNC) through a home NodeB gateway and a core network, or sending the signaling carrying the cell update information to a source home NodeB through the home NodeB gateway;

the target home NodeB receiving signaling carrying UE Context and returned by the SRNC or the source home NodeB; and the target home NodeB allocating corresponding radio resources to the UE and sending a cell update confirmation message to the UE.

The sending the signaling carrying the cell update information to the source home NodeB through the home NodeB gateway comprises:

when the target home NodeB and the source home NodeB belong to different home NodeB gateways, the target home NodeB sending the signaling carrying the cell update information to a home NodeB gateway to which the source home NodeB belongs through a home NodeB gateway to which the target home NodeB belongs, and the home NodeB gateway to which the source home NodeB belongs sending the signaling carrying the cell update information to the source home NodeB; or when the target home NodeB and the source home NodeB belong to the same home NodeB gateway, the target home NodeB sending the signaling carrying the cell update information to the source home NodeB through a home NodeB gateway to which the target home NodeB belongs.

The communication between the home NodeB gateways is implemented via an interface therebetween or the core network, the interface being an Asynchronous Transfer Mode (ATM) or IP transmission protocol architecture based interface.

The signaling carrying the cell update information is a cell update request, a relocation request or uplink signaling transfer indication signaling.

The signaling carrying the UE Context is a ell update request confirmation message, a relocation request or relocation required signaling.

The signaling carrying the cell update information contains a Radio Network Temporary Identifier (RNTI) of the UE, routing information of the source home NodeB/SRNC and the target home NodeB, and/or reasons for cell update.

The routing information includes a location area identity, a routing area code, and/or a RNC identifier/home NodeB gateway identifier/home NodeB identifier.

The UE Context includes radio access bearer information, allocated resource information and/or data service information.

The method for cell update further comprises: after receiving the cell update confirmation message, the UE returning a response message to the target home NodeB.

The response message is a Terrestrial Radio Access Network (UTRAN) mobility information confirmation response message, a physical channel reconfiguration completion response message, a transport channel reconfiguration completion response message or a radio bearer reconfiguration completion response message.

The present invention further provides a system for cell update comprising a target home NodeB, a home NodeB gateway and a source home NodeB.

Specifically, the target home NodeB is configured to receive cell update signaling sent by a UE, send signaling carrying cell update information to the source home NodeB through the home NodeB gateway, and receive signaling carrying UE Context and returned by the source home NodeB; and allocate corresponding radio resources to the UE and send a cell update confirmation message to the UE.

The target home NodeB and the source home NodeB belong to the same or different home NodeB gateways.

When the target home NodeB and the source home NodeB belong to different home NodeB gateways, the target home NodeB sends the signaling carrying the cell update information to a home NodeB gateway to which the source home NodeB belongs through a home NodeB gateway to which the target home NodeB belongs, and the home NodeB gateway to which the source home NodeB belongs sends the signaling carrying the cell update information to the source home NodeB.

The communication between the home NodeB gateways is implemented via an interface therebetween or a core network, the interface being an Asynchronous Transfer Mode (ATM) or IP transmission protocol architecture based interface.

The signaling carrying the cell update information is a cell update request, a relocation request or uplink signaling transfer indication signaling.

The signaling carrying the UE Context is a cell update request confirmation message, a relocation request or relocation required signaling.

The signaling carrying the cell update information contains a Radio Network Temporary Identifier (RNTI) of the UE, routing information of the source home NodeB and the target home NodeB, and/or reasons for cell update.

The routing information location area identity, a routing area code, and/or a home NodeB gateway identifier/home NodeB identifier.

The UE Context includes radio access bearer information, allocated radio resource information and/or data service information.

The present invention further provides a system for cell update comprising a target home NodeB, a home NodeB gateway, a Source Radio Network Controller (SRNC) and a core network.

Specifically, the target home NodeB is configured to receive cell update signaling sent by a UE, send signaling carrying cell update information to the SRNC through the home NodeB gateway and the core network, and receive signaling carrying UE Context and returned by the SRNC; and allocate corresponding radio resources to the UE and send a cell update confirmation message to the UE.

The signaling carrying the cell update information is a cell update request, a relocation request or uplink signaling transfer indication signaling.

The signaling carrying the UE Context is a cell update request confirmation message, a relocation request or relocation required signaling.

The signaling carrying the cell update information contains a Radio Network Temporary Identifier (RNTI) of the UE, routing information of the SRNC and target home NodeB, and/or reasons for cell update.

The routing information includes a location area identity, a routing area code, and/or a SRNC identifier/home NodeB gateway identifier/home NodeB identifier.

The UE Context includes radio access bearer information, allocated radio resource information and/or data service information.

The method and system for cell update in accordance with the present invention transfer the signaling carrying the cell update information through the core network or the interface between the home NodeB gateways, so as to enable the UE to perform cell update without restriction, and enhance user experiences.

PREFERRED EMBODIMENTS OF THE PRESENT INVENTION

The basic idea of the present invention is to transfer signaling carrying cell update information through a core network or an interface between a RNC and a home NodeB gateway or an interface between home NodeB gateways, so as to enable a UE to perform cell update without restriction, and enhance user experiences.

In order to make objects, technical schemes and advantages of the present invention more clear, he present invention will be further described in detail in conjunction with accompanying drawings.

Figure 2:
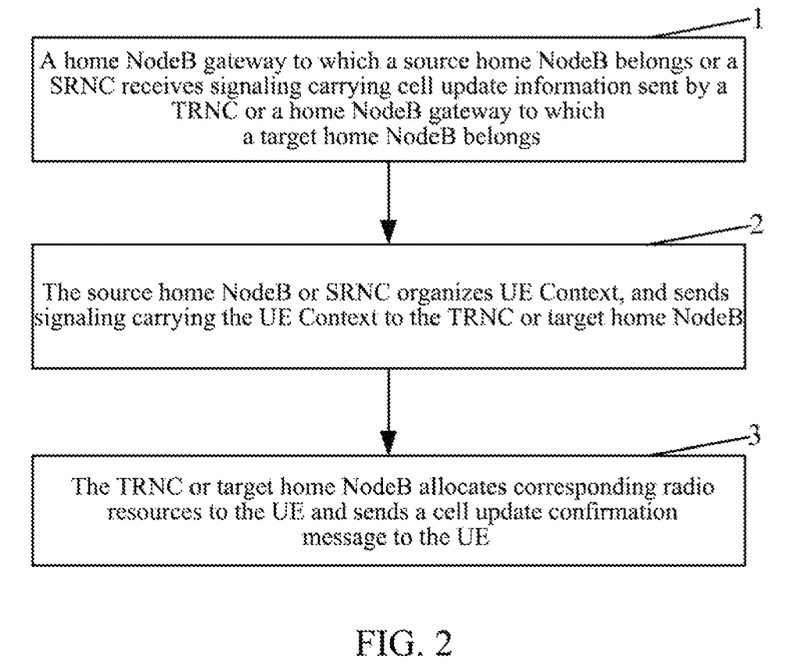
FIG. 2 is a flowchart of a method for cell update according to the present invention.

FIG. 2 is a flowchart of a method for cull update according to the present invention. As shown in FIG. 2 the method in accordance with the present invention comprises the following steps.

Step 1: a home NodeB gateway to which a source home NodeB belongs or a SRNC receives signaling carrying cell update information sent by a TRNC or a home NodeB gateway to which a target home NodeB belongs.

In this step, the signaling carrying the cell update information is a cell update request, a relocation request or uplink signaling transfer indication signaling, and the name of the signaling will not be limited by the present invention. The signaling carrying the cell update information contains routing information of the source home NodeB/SRNC and TRNC/target home NodeB and reasons for cell update. The routing information includes Location Area Identity (LAI), Routing Area Code (RAC) and/or RNC identifier/home NoseB identifier/home NodeB identifier. Other contents of the signaling carrying the ell update information can be placed in a transparent container.

Step 2: the source home NodeB or SRNC organizes UT Context and sends signaling carrying the UE Context to the TRNC or target home NodeB.

In this step, the LT Context includes established Radio Access Bearer B) information, allocated radio resource information, data service information, etc.

In addition, after sending the signaling carrying the UE Context, the SRNC/source home NodeB can release radio resources originally allocated to the UE.

Step 3: the TRNC or target home NodeB allocates corresponding radio resources to the UE and sends a cell update confirmation message to the UE.

In this step, the cell update confirmation message contains a newly allocated S-RNTI, Cell_Radio Network Temporary Identifier (C-RNTI) and configuration information of the RAB, and may also include an identifier of a home NodeB gateway to which the home NodeB belongs.

Allocating corresponding radio resources to the UE comprises: allocating a new service RNC Radio Network Temporary Identifier (S-RNTT), and further establishing a wireless link or reconfiguring a physical channel or reconfiguring a transmission channel, etc., if necessary.

The method in accordance with the present invention further comprises: after receiving the cell update confirmation message, the UE returning a response message to the TRNC or target home NodeB. The response message may be a UTRAN mobility information confirm, or physical channel reconfiguration completion, or transport channel reconfiguration completion, or radio bearer reconfiguration completion response message.

In the present invention, the communication between the home NodeB gateways or between the home NodeB gateway and the RNC is implemented through an interface therebetween or a core network. The interfaces between the home NodeB gateways and between the home NodeB gateway and the RNC may be based on an Asynchronous Transfer Mode (ATM) or IP transmission protocol architecture, for example, a existing Iur protocol architecture can be used.

The method for cell update in accordance with the present invention will be further described hereinafter through embodiments and accompanying drawings.

The First Embodiment

In this embodiment, a UE is in a connected state, such as Cell_DCH state or Cell_FACH state or Cell_PCH state or URA_PCH state, in a cell which is under the jurisdiction of a RNC that is referred to as a SRNC. At a certain time, the UE initiates cell update or URA update for reasons such as wireless link failure, etc. The UE is selected or reselected to be in a new Closed Subscriber Group (CSG) cell and initiates cell update in the CSG cell. The home NodeB to which the CSG cell belongs is a target home NodeB.

Figure 3:
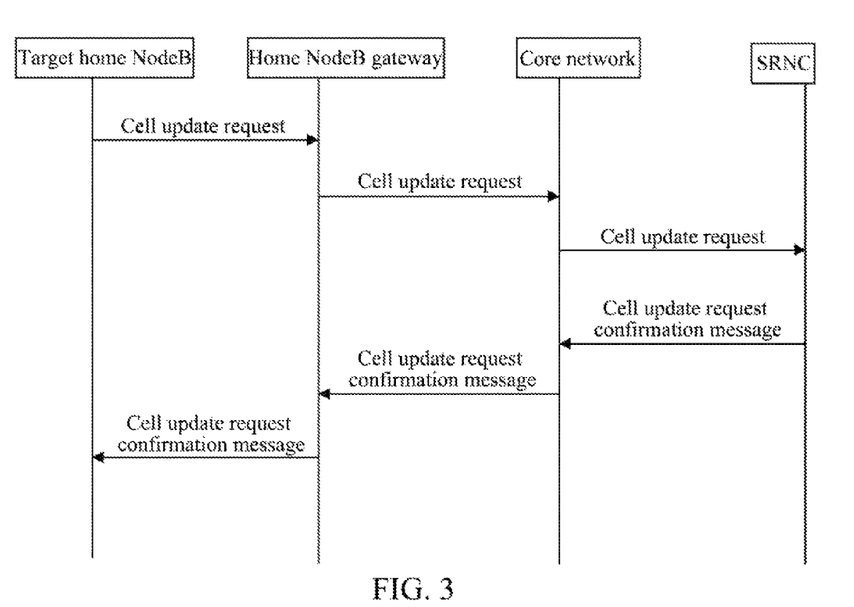
FIG. 3 is a flowchart of a method for cell update according to the first embodiment of the present invention.

FIG. 3 is a flowchart of a method for cell update according to the first embodiment of the present invention. As shown in FIG. 3, the method in accordance with the present invention comprises the following steps.

Step 11: a UE sends cell update signaling to a target home NodeB.

In this step, the cell update signaling carries a UTRAN Radio Network Temporary Identifier (U-RNTI), which is comprised of a SRNC Identifier (SRNC ID) and a S-RNTI of the UE.

Step 12: the target home NodeB sends a cell update request to a home NodeB gateway to which the target home NodeB belongs, and the home NodeB gateway forwards the cell update request to a core network.

In this step, the cell update request may also be a relocation request, or an uplink signaling transfer indication, etc. The cell update request contains routing information of the target home NodeB and SRNC and reasons for cell update. The routing information includes Location Area Identity (LAI), Routing Area Code (RAC) and SRNC identifier and home NodeB gateway identifier. The routing information may also include information identifying the home NodeB, such as cell identity or CSG ID. The cell update request may also include a Radio Network Temporary Identifier (RNTI) of the UE.

Step 13: the core network sends a cell update request to the SRNC.

In this step, the cell update request contains the RNTI of the UE, the routing information of the target home NodeB and reasons for cell update.

Step 14: the SRNC organizes UE Context, and sends a cell update request confirmation message carrying the UE Context to the core network.

In this step, the UE Context includes established RAB information, allocated radio resource information, data service information, etc.

In addition, after sending the cell update request confirmation message, the SRNC can release radio resources originally allocated to the UE.

Step 15: the core network sends the cell update request confirmation message to the home NodeB gateway, which forwards the cell update request confirmation message to the target home NodeB.

Step 16: the target home NodeB allocates corresponding radio resources to the UE, and sends a cell update confirmation message to the UE.

The cell update confirmation message contains a newly allocated S-RNTI, C-RNTI and configuration information of the RAB, and may also include an identifier of a home NodeB gateway to which the home NodeB belongs.

Step 17: after receiving the cell update confirmation message, the UE returns a response message to the target home NodeB.

The UE side has successfully completed the cell update procedure through the steps described above, and the UE has resided in a new CSG cell.

It should be noted that in this embodiment, the cell update procedure is completed by acquiring the UE Context from the SRNC through the cell update request. The cell update procedure can also be implemented through a relocation procedure after the SRNC receives information of the cell update request, that is, the SRNC sends a relocation request to the target home NodeB through the core network. At the source side, it is relocation required signaling that is sent by the SRNC to the core network. After allocating radio resources to the UE, the target home NodeB sends a relocation command to the SRNC through the core network. At the target side, it is a relocation request acknowledgment message that is sent by the target home NodeB to the core network through the home NodeB gateway, and meanwhile, the target home NodeB sends a cell update confirmation message to the UE. After receiving a UTRAN mobility information confirmation response message of the UE, the target home NodeB sends a relocation completion message to the core network. The core network will send an Iu release command to the SRNC to release radio resources of the UE.

In this embodiment, the UE is originally located in a cell which is under the jurisdiction of the SRNC. If the UE is originally located in a cell which is under jurisdiction of the home NodeB (source home NodeB), the process is similar to the above process, except that the cell update request is required to be sent to the source home NodeB through the core network and/or home NodeB gateway. If the source home NodeB and the target home NodeB do not belong to the same home NodeB gateway, the transfer of the cell update request is required to be implemented through both the source and target home NodeB gateways by means of an interface between the two home NodeB gateways or the core network. Particularly, if the source home NodeB and the target home NodeB belong to the same home NodeB gateway, the cell update request may not be sent through the core network. Only the cell update request, relocation request or uplink signaling transfer indication sent by the target home NodeB are required to be sent to the source home NodeB through the home NodeB gateway to implement the cell update procedure of the UE. If the target cell selected by the UE is a cell which is under the jurisdiction of another RNC, there will be no Iur interface between the TRNC and the SRNC. Cell update can also be implemented by the method used in this embodiment.

The Second Embodiment

In this embodiment, a UE is in a connected state, such as Cell_DCH state or Cell_FACH state or Cell_PCH state or URA_PCH state, in a cell which is under the jurisdiction of a home NodeB that is referred to as a source home NodeB. At a certain time, the UE initiates cell update or URA update for reasons such as wireless link failure or unrepairable RLC error, etc. The UE is selected or reselected to be in a macro cell which is under the jurisdiction of a new RNC that is referred to as a TRNC. The UE initiates cell update in the macro cell.

Figure 4:
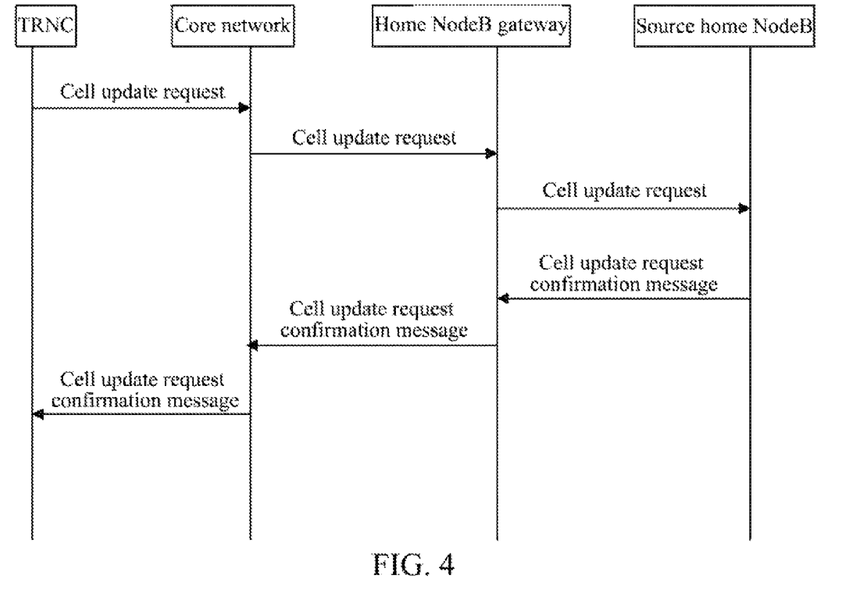
FIG. 4 is a flowchart of a method for cell update according to the second embodiment of the present invention.

FIG. 4 is a flowchart of a method for cell update according to the second embodiment of the present invention. As shown in FIG. 4, the method in accordance with the present invention comprises the following steps.

Step 21: a UE sends cell update signaling to a TRNC.

In this step, the cell update signaling carries a U-RNTI, which is comprised of a SRNC ID and S-RNTI. At this point, the SRNC ID represents an identifier of a home NodeB gateway to which a source home NodeB belongs.

Step 22: the TRNC sends a cell update request to a core network.

Step 23: the core network sends a cell update request to a home NodeB gateway to which the source home NodeB belongs, and the home NodeB gateway forwards the cell update request to the source home NodeB.

Step 24: the source home NodeB organizes UE Context, and sends a cell update request confirmation message carrying the UE Context to the home NodeB gateway to which the source home NodeB belongs, and the home NodeB gateway forwards the cell update request confirmation message to the core network.

In this step, the UE Context includes established RAB information, allocated radio resource information, data service information, etc.

Step 25: the core network sends a cell update request confirmation message to the TRNC, and after receiving the message, the TRNC allocates corresponding radio resources to the UE and sends a cell update confirmation message to the UE.

In this step, corresponding radio resources, such as a new service RNC Radio Network Temporary Identifier (S-RNTI), is allocated to the UE, and a wireless link is established or a physical channel is reconfigured or a transmission channel is reconfigured or radio bearer is reconfigured, if necessary.

The cell update confirmation message contains a newly allocated S-RNTI, C-RNTI and configuration information of the RAB, and may also include an identifier of the TRNC.

Step 26: after receiving the cell update confirmation message, the UE returns a response message to the TRNC.

The UE side has completed the cell update procedure through the steps described above, and the UE has resided in a new macro cell.

It should be noted that in this embodiment, the cell update procedure is completed by acquiring the UE Context from the source home NodeB through the cell update request. The cell update procedure can also be implemented through a relocation procedure after the home NodeB receives information of the cell update request.

The Third Embodiment

In this embodiment, an interface is established between a RNC and a home NodeB gateway such that the RNC and the home NodeB gateway can communicate with each other directly. The interface between the RNC and the home NodeB gateway may be based on an ATM or IP transmission protocol architecture, for example, the existing her protocol architecture can be used.

A UE is in a connected state, such as Cell_DCH state or Cell_FACH state or Cell_PCH state or URA_PCH state, in a cell which is under the jurisdiction of a RNC that is referred to as a SRNC. At a certain time, the UE initiates cell update or URA update for reasons such as wireless link failure, etc. The UE is selected or reselected to be in a new CSG cell and initiates cell update in the CSG cell. The home NodeB to which the CSG cell belongs is a target home NodeB.

Figure 5:
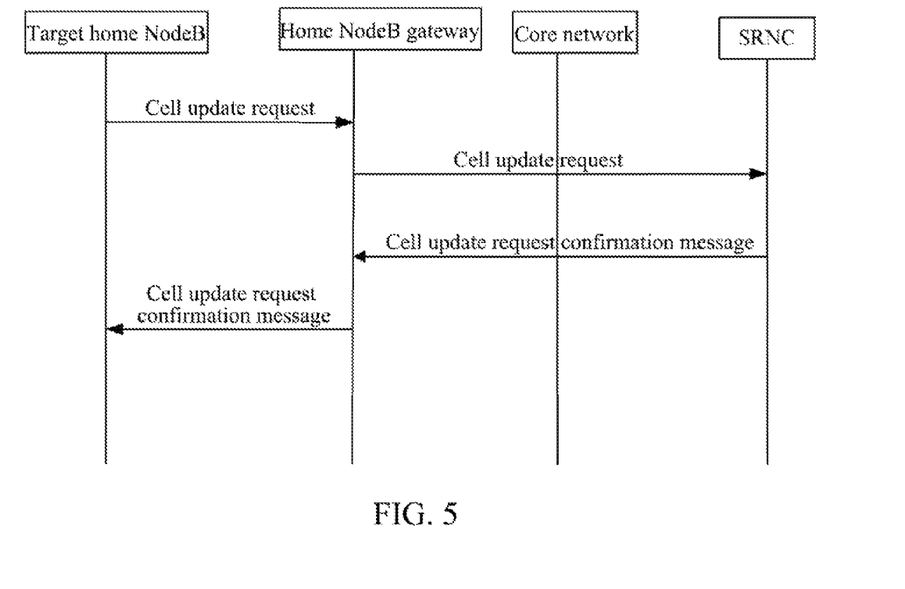
FIG. 5 is a flowchart of a method for cell update according to the third embodiment of the present invention.

FIG. 5 is a flowchart of a method for cell update according to the third embodiment of the present invention. As shown in FIG. 5, the method in accordance with the present invention comprises the following steps.

Step 31: a UE sends cell update signaling to a target home NodeB.

In this step, the cell update signaling carries a U-RNTI, which is comprised of a SRNC and S-RNTI of the UE.

Step 32: the target home NodeB sends a cell update request to a home NodeB gateway to which the target home NodeB belongs, and the home NodeB gateway sends the cell update request to a SRNC.

Step 33: the SRNC organizes UE Context, and sends a cell update request confirmation message carrying UE Context to a home NodeB gateway to which the target home NodeB belongs.

Step 34: the home NodeB gateway forwards the cell update request confirmation message to the target home NodeB.

Step 35: the target home NodeB allocates corresponding radio resources to the UE, and sends a cell update confirmation message to the UE.

Step 36: after receiving the cell update confirmation message, the UE returns a response message to the target home NodeB.

The UE side has completed successfully the cell update procedure through the steps described above, and the UE has resided in a new CSG cell.

In this embodiment, the cell update procedure is completed by acquiring the UE Context by using the cell update request, and the cell update procedure may also be implemented by using the existing relocation procedure, See the fourth embodiment hereinafter.

In this embodiment, the UE is originally located in a cell which is under the jurisdiction of the SRNC. If the UE is originally located in a cell which is under the jurisdiction of the source home NodeB, as long as the there are similar interfaces between the home NodeB gateway to which the source home NodeB belongs and the home NodeB gateway to which the target home NodeB belongs, the cell update procedure can be implemented by using the above method. Particularly, if the source home NodeB and the target home NodeB belong to the same home NodeB gateway, information of the cell update request can be transferred directly through the home NodeB gateway.

The Fourth Embodiment

The difference between this embodiment and the third embodiment is that the existing relocation procedure is used to implement the cell update procedure in this embodiment.

Figure 6:
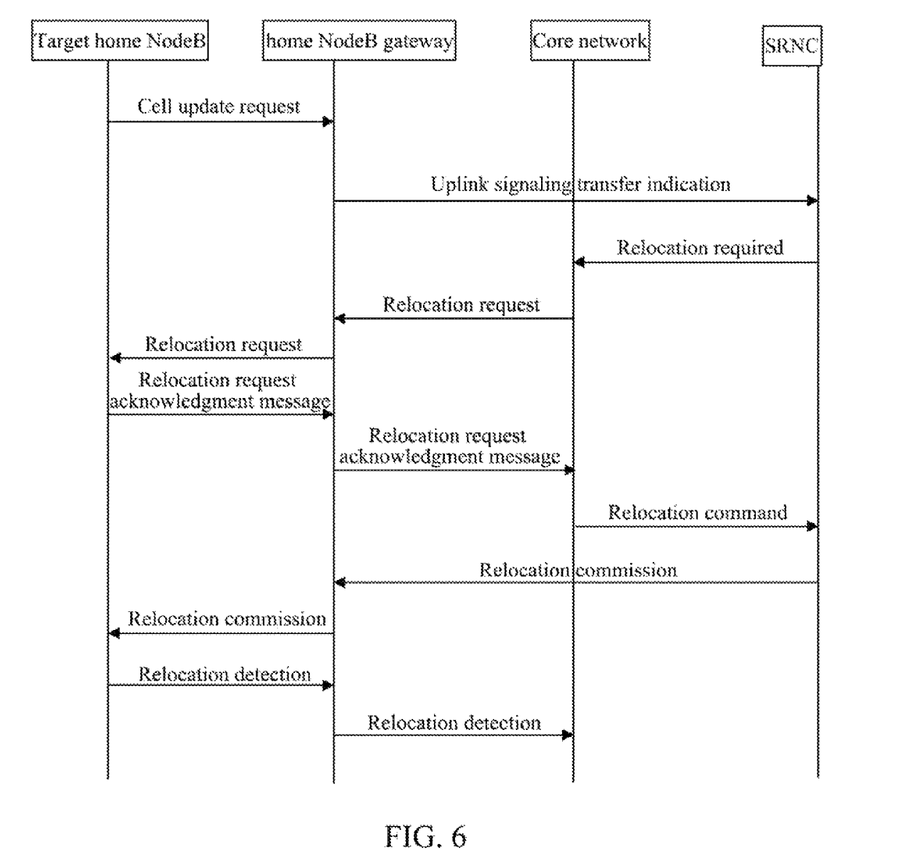
FIG. 6 is a flowchart of a method for cell update according to the fourth embodiment o present invention.

FIG. 6 is a flowchart of a method for cell update according to the fourth embodiment of the present invention. As shown in FIG. 6, the method in accordance with the present invention comprises the following steps.

Step 41: UE sends cell update signaling to a target home NodeB.

In this step, the cell update signaling carries a U-RNTI, which is comprised of a SRNC ID and S-RNTI.

Step 42: the target home NodeB sends a cell update request to a home NodeB gateway to which the target home NodeB belongs, and the home NodeB gateway sends an uplink signaling transfer indication to a SRNC through an interface between the home NodeB gateway and the SRNC.

Step 43: after receiving the uplink signaling transfer indication, the SRNC sends relocation required signaling to a core network.

Step 44: the core network sends a relocation request to the home NodeB gateway, which forwards the relocation request to the target home NodeB.

Step 45: the target home NodeB allocates corresponding radio resources to the UE, and returns a relocation request acknowledgment message to the home NodeB gateway, which sends the relocation request acknowledgment message to the core network.

Step 46: the core network sends a relocation command to the SRNC.

Step 47: the SRNC sends relocation commission to the home NodeB gateway, which forwards the relocation commission to the home NodeB.

Step 48: the target home NodeB sends a cell update confirmation message to the UE, while sending relocation detection to the home NodeB gateway.

In this step, the cell update confirmation message contains a newly allocated S-RNTI, C-RNTI and configuration information of the RAB, and may also include an identifier of a home NodeB gateway to which the home NodeB belongs.

Step 49: the home NodeB gateway sends the relocation detection to the core network, and informs the core network that migration trigger is detected.

In this step, the core network further sends an Iu release command to the SRNC such that the SRNC can release radio resources allocated to the UE.

After receiving the cell update confirmation message, the UE returns a response message to the target home NodeB. The UE side implements the cell update procedure, and the UE has successfully resided in a new CSG cell.

It should be noted that after receiving the relocation commission, the home NodeB can on one hand, inform the home NodeB of the relocation commission, and on the other hand, send the relocation detection to the core network at the same time.

The Fifth Embodiment

In this embodiment, an interface is established between a RNC and a home NodeB gateway such that the RNC and the home NodeB gateway can communicate with each other directly. The interface between the RNC and the home NodeB gateway may be based on an ATM or IP transmission protocol architecture, for example, the existing Iur protocol architecture can be used.

A UE is in a connected state, such as Cell_DCH state or Cell_FACH state or Cell_PCH state or URA_PCH state, in a cell which is under the jurisdiction of a home NodeB that is referred to as a source home NodeB. At a certain time, the UE initiates cell update or URA update for reasons such as wireless link failure or unrepairable RLC error, etc. The UE is selected or reselected to be in a macro cell which is under the jurisdiction of a new RNC that is referred to as a TRNC. The UE initiates cell update in the macro cell.

Figure 7:
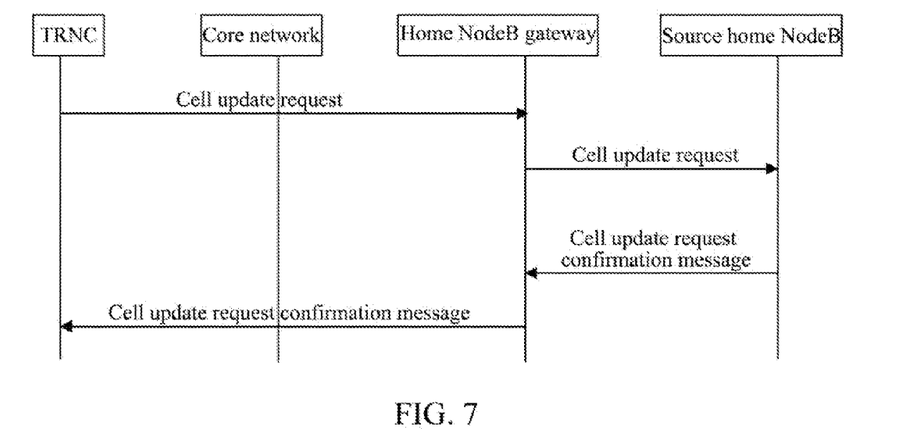
FIG. 7 is a flowchart of a method for cell update according to the fifth embodiment of the present invention.

FIG. 7 is a flowchart of a method for cell update according to the fifth embodiment of the present invention. As shown in FIG. 7, the method in accordance with the present invention comprises the following steps.

Step 51: a UE sends cell update signaling to a TRNC.

Step 52: the TRNC sends a cell update request to a home NodeB gateway to which a source home NodeB belongs, and the home NodeB gateway forwards the cell update request to the source home NodeB.

Step 53: the source home NodeB organizes UE Context, and sends a cell update request confirmation message carrying the UE Context to a home NodeB gateway to which the source home NodeB belongs, and the home NodeB gateway forwards the cell update request confirmation message to the TRNC.

Step 54: the TRNC allocates corresponding radio resources to the UE, and sends the cell update confirmation message to the UE.

Step 55: after receiving the cell update confirmation message, the UE returns a response message to the TRNC.

The procedure of this embodiment is similar to that of the second embodiment, and will not be repeated here.

The present invention further provides a system for implementing the above methods for cell update, which is used to implement the cell update procedure of the UE originally located in the home NodeB cell when the target cell is a home NodeB cell, The system comprises a. target home NodeB gateway, a target home NodeB, a source home NodeB gateway and a source home NodeB.

The source home NodeB gateway is a home NodeB gateway to which the source home NodeB belongs, and the target home NodeB gateway is a home NodeB gateway to which the target home NodeB belongs.

Specifically, the target home NodeB gateway is configured to send signaling carrying cell update information sent by the target home NodeB to the source home NodeB gateway.

The source home NodeB organizes UE Context and sends signaling carrying the UE Context to the source home NodeB gateway based on the signaling carrying the cell update information sent by the source home NodeB gateway.

The source home NodeB gateway is configured to send the signaling carrying the UE Context sent by the source home NodeB to the target home NodeB.

The target home NodeB is configured to receive cell update signaling sent by the UE, and receive the signaling carrying the UE Context sent by the target home NodeB gateway, allocate corresponding radio resources to the UE, and send a cell update confirmation message to the UE.

The target home NodeB gateway and the source home NodeB gateway may be the same home NodeB gateway, that is, the target home NodeB gateway and the source home NodeB gateway belong to the same home NodeB gateway.

The target home NodeB gateway and the source home NodeB gateway may be different home NodeB gateways. At this point, the target home NodeB gateway and the source home NodeB gateway can communicate with each other through a core network, or can also communicate with each other directly through an ATM or IP transmission protocol architecture based interface therebetween, which may be an fur interface.

The signaling carrying cell update information is a cell update request, a relocation request, or uplink signaling transfer indication signaling.

The signaling carrying the UE Context is a cell update request confirmation message, a relocation request, or relocation required signaling.

The signaling carrying the cell update information contains a Radio Network Temporary Identifier (RNTI) of the UE routing information of the source home NodeB and the target home NodeB, and/or reasons for cell update. The routing information includes a location area identity, a routing area code, and/or a home NodeB gateway identifier/home NodeB identifier.

The UE Context includes radio access bearer information, allocated radio resource information and/or data service information.

The present invention further provides a system for implementing the above methods for cell update, which is used to implement a cell update procedure of the UE originally located in a macro cell when a target cell is a home NodeB cell. The home NodeB gateway communicates with a SRNC through a core network. The system comprises a target home NodeB, a home NodeB gateway, a SRNC and a core network.

Specifically, the target home NodeB is configured to receive cell update signaling sent by the UE, send signaling carrying cell update information to the SRNC through the home NodeB gateway and the core network, and receive signaling carrying UE Context and returned by the SRNC; and allocate corresponding radio resources to the UE and send a cell update confirmation message to the UE.

The signaling carrying the cell update information is a cell update request, a relocation request or uplink signaling transfer indication signaling.

The signaling carrying the UE Context is a cell update request confirmation message, a relocation request or relocation required signaling.

The signaling carrying the cell update information contains a RNTI of the UE, routing information of the SRNC and the target home NodeB, and/or reasons for cell update.

The routing information includes a location area identity, a routing area code, and/or a RNC identifier/home NodeB gateway identifier/home NodeB identifier.

The UE Context includes radio access bearer information, allocated radio resource information and/or data service information.

The present invention further provides a system for implementing the above methods for cell update, which is used to implement a cell update procedure of a UE originally located in a macro cell when a target cell is a home NodeB cell. A home NodeB gateway communicates with a RNC through an ATM or IP transmission protocol architecture based interface.

The system comprises a home NodeB gateway, a SRC and a target home NodeB.

Specifically, the target home NodeB is configured to receive cell update signaling sent by the UE, send signaling carrying cell update information to the home NodeB gateway, and allocate corresponding radio resources to the UE based on signaling carrying UE Context sent by the home NodeB gateway.

The home NodeB gateway is configured to send the signaling carrying the cell update information to the SRNC, and send the signaling carrying the UE Context to the target home NodeB based on the signaling carrying the UE Context returned by the SRNC.

The SRNC is configured to organize the UE Context based on the signaling carrying the cell update information sent by the home NodeB gateway and return the signaling carrying the UE Context to the home NodeB gateway.

The present invention further provides a system for implementing the above methods for cell update, which is used to implement a cell update procedure of a UE originally located in a home NodeB cell when a target cell is a macro cell. A home NodeB gateway communicates with a TRNC through an ATM or IP transmission protocol architecture based interface.

The system comprises a home NodeB gateway, a TRW and a source home NodeB.

Specifically, the TRNC is configured to receive cell update signaling sent by the UE, send signaling carrying cell update information to the home NodeB gateway; and receive signaling carrying UE Context sent by the home NodeB gateway, and allocate corresponding radio resources to the UE.

The home NodeB gateway is configured to send the signaling carrying the cell update information to the source home NodeB, and send the signaling carrying the UE Context to the TRNC based on the signaling carrying the UE Context returned by the source home NodeB.

The source home NudeB is configured to organize the UE Context based on he signaling carrying the cell update information sent by the home NodeB gateway and return the signaling carrying the UE Context to the home NodeB gateway.

The present invention further provides a system for implementing the above methods for cell update, which is used to implement a cell update procedure of a UE originally located in a home NodeB cell when a target cell is a macro cell, A home NodeB gateway communicates with a TRNC through a core network, The system comprises a source home NodeB, a home NodeB gateway, a TRNC and a core network.

Specifically, the TRNC is configured to receive cell update signaling sent by the UE, send signaling carrying cell update information to the core network, and allocate corresponding radio resources to the UE based on signaling carrying UE Context sent by the core network.

The core network is configured to send the signaling carrying the cell update information to the home NodeB gateway, and send the signaling carrying the UE Context sent by the home NodeB gateway to the TRNC.

The home NodeB gateway is configured to send the signaling carrying the cell update information to the source home NodeB based on the signaling carrying the cell update information sent by the core network.

The source home NodeB is configured to organize the UE Context based on the signaling carrying the cell update information sent by the home NodeB gateway and return the signaling carrying the UE Context to the home NodeB gateway.

The method and system in accordance with the present invention can enable the UE to perform the cell update without restriction, and enhance user experiences.

The above description is only the preferred embodiments of the present invention and is not intended to limit the protection scope of the present invention.

What we claim is:

1. A method for cell update comprising:
   when an User Equipment (UE) which is in a connected state in a cell under jurisdiction of a Source Radio Network Controller (SRNC) initiates a cell update to a cell under jurisdiction of a target home NodeB;
   the target home NodeB receiving cell update signaling sent by the UE;
   the target home NodeB sending signaling carrying cell update information to the SRNC through a home NodeB gateway;
   the target home NodeB receiving signaling carrying UE Context returned by the SRNC; and
   the target home NodeB allocating corresponding radio resources to the UE and sending a cell update confirmation message to the UE;
   or
   when an UE which is in a connected state in a cell under jurisdiction of a Source home NodeB initiates a cell update to a cell under jurisdiction of a target Radio Network Controller (TRNC);
   the TRNC receiving cell update signaling sent by the UE;
   the TRNC sending signaling carrying cell update information to the Source home NodeB through a home NodeB gateway;
   the TRNC receiving signaling carrying UE Context returned by the Source home NodeB; and
   the TRNC allocating corresponding radio resources to the UE and sending a cell update confirmation message to the UE;
   or
   when an UE which is in a connected state in a cell under jurisdiction of a Source home NodeB initiates a cell update to a cell which is under jurisdiction of a target home NodeB;
   the target home NodeB receiving cell update signaling sent by the UE;
   the target home NodeB sending signaling carrying cell update information to a source home NodeB through a home NodeB gateway;
   the target home NodeB receiving signaling carrying UE Context returned by the source home NodeB; and
   the target home NodeB allocating corresponding radio resources to the UE and sending a cell update confirmation message to the UE;
   wherein
   the target home NodeB sending the signaling carrying the cell update information to the source home NodeB through the home NodeB gateway comprises:
   when the target home NodeB and the source home NodeB belong to different home NodeB gateways, the target home NodeB sending the signaling carrying the cell update information to a home NodeB gateway to which the source home NodeB belongs through a home NodeB gateway to which the target home NodeB belongs, and the home NodeB gateway to which the source home NodeB belongs sending the signaling carrying the cell update information to the source home NodeB; or
   when the target home NodeB and the source home NodeB belong to the same home NodeB gateway, the target home NodeB sending the signaling carrying the cell update information to the source home NodeB through a home NodeB gateway to which the target home NodeB belongs;
   wherein a communication between the home NodeB gateways, or between the TRNC and the home NodeB gateway, or between the SRNC and the home NodeB gateway, is implemented via an interface established therebetween or the core network, the interface is an Asynchronous Transfer Mode (ATM) or IP transmission protocol architecture based interface.

2. The method according to claim 1, wherein the signaling carrying the cell update information is a cell update request, a relocation request or uplink signaling transfer indication signaling.

3. The method according to claim 1, wherein the signaling carrying the UE Context is a cell update request confirmation message, a relocation request or relocation required signaling.

4. The method according to claim 1, wherein the signaling carrying the cell update information contains a Radio Network Temporary Identifier (RNTI) of the UE, routing information of the source home NodeB/SRNC and the target home NodeB, and/or reasons for cell update;
the routing information includes a location area identity, a routing area code, and/or a RNC identifier/home NodeB gateway identifier/home NodeB identifier; and
the UE Context includes radio access bearer information, allocated resource information and/or data service information.

5. The method according to claim 1, further comprises after receiving the cell update confirmation message, the UE returning a response message to the target home NodeB or the TRNC; wherein
the response message is a Terrestrial Radio Access Network (UTRAN) mobility information confirmation response message, a physical channel reconfiguration completion response message, a transport channel reconfiguration completion response message or a radio bearer reconfiguration completion response message.

6. A system for cell update comprising a target home NodeB, a home NodeB gateway and a source home NodeB, wherein
the target home NodeB is configured to receive cell update signaling sent by a UE which is in a connected state in a cell which is under jurisdiction of the Source home NodeB, send signaling carrying cell update information to the source home NodeB through the home NodeB gateway, and receive signaling carrying UE Context and returned by the source home NodeB; and allocate corresponding radio resources to the UE and send a cell update confirmation message to the UE;
wherein the target home NodeB and the source home NodeB belong to the same or different home NodeB gateways;
when the target home NodeB and the source home NodeB belong to different home NodeB gateways, the target home NodeB sends the signaling carrying the cell update information to a home NodeB gateway to which the source home NodeB belongs through a home NodeB gateway to which the target home NodeB belongs, and the home NodeB gateway to which the source home NodeB belongs sends the signaling carrying the cell update information to the source home NodeB;
wherein the communication between the home NodeB gateways is implemented via an interface therebetween or a core network, the interface being an Asynchronous Transfer Mode (ATM) or IP transmission protocol architecture based interface;
wherein the signaling carrying the cell update information contains a Radio Network Temporary Identifier (RNTI) of the UE, routing information of the source home NodeB and the target home NodeB, and/or reasons for cell update;
the routing information includes a location area identity, a routing area code, and/or a home NodeB gateway identifier/home NodeB identifier; and
the UE Context includes radio access bearer information, allocated radio resource information and/or data service information.

7. The system according to claim 6, wherein the signaling carrying the cell update information is a cell update request, a relocation request or uplink signaling transfer indication signaling.

8. The system according to claim 6, wherein the signaling carrying the UE Context is a cell update request confirmation message, a relocation request or relocation required signaling.

9. A system for cell update comprising a home NodeB, a home NodeB gateway and a Radio Network Controller (RNC), wherein
when a UE which is in a connected state in a cell which is under jurisdiction of the RNC initiates cell update in a cell which is under jurisdiction of the home NodeB, the home NodeB is configured to receive cell update signaling sent by a UE, send signaling carrying cell update information to the RNC through the home NodeB gateway, and receive signaling carrying UE Context and returned by the RNC; and allocate corresponding radio resources to the UE and send a cell update confirmation message to the UE;
when an UE which is in a connected state in a cell under jurisdiction of the home NodeB initiates a cell update to a cell under jurisdiction of the RNC, the RNC is configured to receive cell update signaling sent by an UE, send signaling carrying cell update information to the home NodeB through the home NodeB gateway, and receive signaling carrying UE Context returned by the home NodeB; and allocate corresponding radio resources to the UE and send a cell update confirmation message to the UE;
wherein the signaling carrying the cell update information contains a Radio Network
Temporary Identifier (RNTI) of the UE, routing information of the SRNC and target home NodeB, and/or reasons for cell update;
the routing information includes a location area identity, a routing area code, and/or a SRNC identifier/home NodeB gateway identifier/home NodeB identifier; and
the UE Context includes radio access bearer information, allocated radio resource information and/or data service information;
wherein the communication between the home NodeB gateway and the RNC is implemented via an interface therebetween or a core network, the interface being an Asynchronous Transfer Mode (ATM) or IP transmission protocol architecture based interface.

10. The system according to claim 9, wherein the signaling carrying the cell update information is a cell update request, a relocation request or uplink signaling transfer indication signaling.

11. The system according to claim 9, wherein the signaling carrying the UE Context is a cell update request confirmation message, a relocation request or relocation required signaling.

* * * * *